United States Patent [19]
Hattori et al.

[11] Patent Number: 5,135,069
[45] Date of Patent: Aug. 4, 1992

[54] VEHICLE RUDDER ANGLE CONTROL APPARATUS

[75] Inventors: Katsuhiko Hattori, Nagoya; Yasutaka Hayashi, Seto; Tsugiharu Matsunaga, Nagoya, all of Japan

[73] Assignee: Kabushiki Kaisha Toyota Chuo Kenkyusho, Aichi, Japan

[21] Appl. No.: 366,778

[22] Filed: Jun. 14, 1989

[30] Foreign Application Priority Data

Jun. 17, 1988 [JP] Japan .................................. 63-150450

[51] Int. Cl.$^5$ ............................................. B62D 5/00
[52] U.S. Cl. .................................. 180/142; 74/388 PS
[58] Field of Search ............... 180/141, 142, 143, 145, 180/132, 133, 79; 74/388 PS, 388 R; 91/368

[56] References Cited

U.S. PATENT DOCUMENTS

| | | | |
|---|---|---|---|
| 4,715,464 | 12/1987 | Nakamura et al. | 180/142 |
| 4,730,687 | 3/1988 | Chikuma et al. | 180/142 |
| 4,741,408 | 5/1988 | Baasch et al. | 180/79.1 |
| 4,940,105 | 7/1990 | Matsunaga et al. | 180/133 |

*Primary Examiner*—Andres Kashnikow
*Assistant Examiner*—Richard Camby
*Attorney, Agent, or Firm*—Ladas & Parry

[57] ABSTRACT

Apparatus for controlling the steerable wheels of a power-assisted steering unit of a vehicle in which an angle detector is connected to the power assist unit and to a power controller. An abnormality detector is arranged between the steering shaft of the steering wheel and an output shaft of the angle detector to detect an abnormal state based on relative displacement of the steering shaft and the output shaft of the angle detector to produce a signal which is sent to the power controller. The steering shaft is controlled by the power controller to avoid the abnormal state based on the signal from the abnormality detector, a control signal from an electronic control unit based on steering angle of the wheels and a signal from a sensor detecting steering angle of the steering wheel.

6 Claims, 11 Drawing Sheets

VEHICLE RUDDER ANGLE CONTROL APPARATUS

CROSS APPLICATION

This application is related in subject matter to Ser. No. 170,726, now U.S. Pat. No. 4,940,105.

BACKGROUND OF THE INVENTION

I. Field of the Invention

The present invention relates to a vehicle rudder angle control apparatus having an active function and, more particularly, to a fail-safe unit incorporated in a steering system to prevent overrunning of an actuator during failure of a control system except for a power assisting unit to prevent a power-lock phenomenon, and effectively to utilize a power assisting function.

II. Description of the Related Art

High-performance vehicles have been developed along with the recent advancement of electronic techniques. Strong demand has arisen for improving vehicle driving stability in order to decrease fatigue during high-speed, long-distance driving and assure safety at the time of rapid steering.

For example, in a strong side wind, a driver must always concentrate on driving only which leads to increase in mental fatigue. In particular, when a vehicle on a crowded urban highway receives a strong side wind from a valley of buildings, the vehicle encounters a very dangerous phenomenon. In addition, driving at nighttime narrows the field of view and the reaction driver becomes slow in steering action, thus greatly increasing a possibility of danger.

In order to solve the above problems, appropriate vehicle traveling control is demanded wherein motion of the vehicle is detected by various types of sensors and vehicle motion information detected by the sensors is processed by a computer. Therefore, a computer-aided steering support system is required to positively steer the rudder wheels so as to assist the driver's steering on the basis of computer control.

A steering apparatus for assisting driver's steering is proposed as a steering support system to satisfy the above needs. This steering apparatus comprises: an electronic control unit consisting of an electronic circuit; and a servo actuator for performing a power assisting operation. The actuator receives electrical, hydraulic (oil), or pneumatic (air) energy.

In this system, however, when the electronic control unit the failed, "overrunning" or the "power-lock phenomenon" of the actuator occurs to cause a very dangerous condition. The "power-lock phenomenon" is one occurring in a mechanical feedback tracking servo actuator system shown in FIG. 6. A driver cannot steer because the actuator operates in a direction to prevent his steering. More specifically, assume that the electronic control unit or an energy converting element (e.g., an electric motor) for controlling the actuator in accordance with a signal from the electronic control unit does not properly function. In this case, even if the driver turns the steering wheel, i.e., even if a steering force is mechanically applied from a steering shaft to a pinion shaft through a coupling having a predetermined play, an electrohydraulic or pneumatic power is supplied in response to slight movement (rotational angle or displacement) of the pinion shaft or the actuator rod. Further steering cannot be performed. Therefore, the power force acts a direction opposite the direction of the steering force. In an actuator having a small power acting amount, steering will not be completely impossible, but it is very difficult to turn the steering wheel.

In order to solve the above problem of the conventional steering support system, there is proposed a "vehicle steering apparatus" (Japanese Laid-Open Utility Model Publication No. 61-35082) in which a fail-safe unit comprising a solenoid-valve is built into a device for driving a rudder mechanism of rudder wheels. As shown in FIG. 6, this steering apparatus includes a clutch means CH1 connected between an input shaft IA connected to a steering wheel SW and an output shaft OA connected to a rudder control mechanism of each steerable or rudder wheel of the vehicle. The clutch means CH1 is switched from the "OFF" state to the "ON" state in an abnormal state of an output shaft drive unit DD. A clutch means CH2 which performs an engaging/disengaging operation in response to an output signal of a control unit CR for controlling an operating condition of the drive unit DD is arranged between the output shaft OA and the output shaft drive unit DD. When the clutch means CH1 arranged between the input and output shafts IA and OA is switched from the "OFF" state to the "ON" state, a control signal for switching the clutch means CH2 from the "ON" state to the "OFF" state is generated by the control unit. A manual steering force can be smoothly transmitted, and the "steering wheel locking phenomenon" can be prevented. In addition, a conventional drawback which acts an excessive load on the steering wheel to degrade operability can be prevented.

In this conventional steering apparatus, however, the fail-safe unit is operated on the basis of a command from the electronic control unit. When the electrical system fails, the apparatus malfunctions to disable steering. Even if the electrical system is normally operated, one chamber of a power cylinder simply communicates with the other chamber, and an increase in driver's steering force is required. In particular, a very large steering force is required when steering is performed at a gear ratio under the assumption of power assistance. Without power assistance is difficult for the driver to steer.

As described above, proper functioning indispensable to the fail-safe unit cannot be assured in the conventional apparatus.

The present inventors have made extensive studies to solve the conventional problems described above and various systematic experiments and have achieved the present invention.

The present inventors have solved the major conventional problems not by employing electrical system control having a higher possibility of danger in the fail-safe unit upon occurrence of an abnormal state of a vehicle rudder angle control apparatus, but by employing an arrangement utilizing a mechanical means having a higher possibility of assurance and a power medium.

SUMMARY OF THE INVENTION

It is an object of the present invention to provide a vehicle rudder angle control apparatus wherein steering can be performed to assure safe driving even if an electrical system such as an electronic control unit fails.

According to a first aspect of the present invention, there is provided a vehicle rudder angle control apparatus (FIG. 1) including a steering means 1 consisting of a steering shaft and a steering wheel, a steering angle sensor 2 for detecting a steering angle of the steering wheel of the steering means 1, a vehicle movement sensor 3 for detecting amount of movement amount of the vehicle, an electronic control unit 4 for outputting an electrical signal corresponding to a control amount of the steerable wheels of the vehicle on the basis of the steering angle signal output from the steering angle sensor 2 and the vehicle movement amount signal output from the vehicle movement sensor 3, a power control means 5 for converting the control signal output from the electronic control unit 4 into a power output, a power assisting means 6 for driving the steerable or rudder wheels 10 on the basis of the power output from the power control means 5, and a power supply unit 7 for supplying the power to the power control means 5, characterized by comprising: a rudder angle detecting means 8, connected to the power assisting means 6 and the power control means 5, for mechanically detecting a displacement of an output unit of the power assisting means 6; and an abnormality detecting means 9, arranged between the steering shaft of the steering means 1 and the output shaft of the rudder angle detecting means 8, for outputting a state signal from a relative displacement between the input and output shafts, wherein the power control means controls the power for controlling the steerable wheels of the vehicle on the basis of the control signal output from the electronic control unit 4, the state signal output from the abnormality detecting means 9, and the rudder angle signal output from the rudder angle detecting means 8.

The above rudder angle control apparatus has the following operations and effects. That is, the steering angle sensor 2 converts the steering angle of the steering wheel of the steering means 1 into the corresponding electrical signal. The vehicle movement sensor 3 detects a vehicle movement change amount such as a yaw rate of the vehicle and converts the vehicle movement change amount into an electrical signal corresponding to the vehicle movement amount.

The electronic control unit 4 determines the control amount of the rudder wheels 10 on the basis of the steering angle signal output from the steering angle sensor 2 and the vehicle movement amount signal output from the vehicle movement sensor 3 and outputs an electrical signal corresponding to the control amount.

The rudder angle detecting means 8 mechanically detects the displacement of the output unit of the power assisting means 6 and outputs it as an angular displacement to the output shaft.

The abnormality detecting means 9 outputs the state signal in correspondence with the relative displacement between the steering shaft of the steering means 1 and the output shaft of the rudder angle detecting means 8.

The power control means 5 is arranged between the power supply unit 7 and the power assisting means 6 and communicates with the power supply unit 7 and the power assisting means 6 through power transmitting members. The power control means 5 converts the control signal output from the electronic control unit 4 into the power corresponding to the control signal and the power is supplied to the power assisting means 6 or exhausted from the power assisting means 6 through the power transmitting members. The power control means 5 supplies the power corresponding to the state signal from the abnormality detecting means 9 to the power assisting means 6 or exhausts the power from the power assisting means 6 through the power transmitting members.

The power assisting means 6 supplies a mechanical displacement corresponding to the power output from the power control means 5 to drive the rudder wheels 10.

In the normal state of the vehicle rudder angle control apparatus, since the state signal from the abnormality detecting means 9 does not reach an abnormality signal level, the power control means 5 performs normal power conversion on the basis of only the control signal output from the electronic control unit 4. The rudder wheels 10 are driven through the power assisting means 6 and is turned.

When a certain abnormal state occurs in an electrical control system and the relative displacement between the steering shaft of the steering means 1 and the output shaft of the rudder angle detecting means 8 exceeds a predetermined value in the abnormality detecting means 9, an abnormal state is detected. In this case, the state signal corresponding to the relative displacement is output from the abnormality detecting means 9 to the power control means 5. The power is supplied or exhausted from the power control means to the power assisting means in a direction to cause the power level to reach the normal level so as to prevent a further increase in the abnormality signal level. The rudder wheels 10 are driven through the power assisting means 6 and are turned.

As is apparent from the above description, there is provided an arrangement in which the abnormality state detecting means and the means for recovering the abnormal state to the normal state comprise the mechanical means of higher reliability and the same power medium as in the power supply unit. Therefore, even if the electrical system such as the electronic control unit is failed to cause trouble, the rudder wheels can be controlled by the steering means, thus achieving safe driving.

When the power cannot be supplied because of the failure of the power supply unit in addition to the failure of the electrical system such as the electronic control unit or the failure of only the power supply unit, the power cannot be supplied by the power control means to the power assisting means or exhausted therefrom. Even if a wrong (abnormal) command is input from the electronic control unit to an electric motor and the motor is operated, overrunning and the power-lock phenomenon of the rudder angle control unit which occur in the failure of only the electrical system do not occur, so that the driver is not endangered. In this case, the rudder wheels are directly steered from the steering means via the rudder angle detecting means.

According to a second aspect of the present invention, there is provided a vehicle rudder angle control apparatus (FIG. 2) wherein the power control means 5 in the vehicle rudder angle control apparatus of the first aspect comprises a first power control means 40 for controlling the amount of power assist of the power assisting means 6 on the basis of the control signal output from the electronic control unit 4 and the rudder angle signal output from the rudder angle detecting means 8, and a second power control means 50 for controlling the power assisting amount on the basis of the state signal output from the abnormality detecting means 9.

The vehicle rudder angle control apparatus of the second aspect has the following operations and effects. The operations and effects of the second aspect which are different from those of the first aspect will be described in detail below.

The first power control means 40 controls the output power from the power assisting means 6 on the basis of the electrical signal from the electronic control unit 4 and controls an auxiliary steering amount against a driver's steering force or an external force acting on the vehicle.

The second power control means 50 directly controls the output power from the power assisting means 6 independently of the first power control means 40 in accordance with the mechanical signal from the abnormality detecting means 9. The second power control means 50 is primarily operated by the driver's steering force during the failure of the electrical system.

As described above, power control shares are clearly defined and assigned to the first and second power control means 40 and 50. Therefore, control precision and response in the normal and abnormal states can be improved, and the operation in the abnormal state can be assured.

According to a third aspect of the present invention, there is provided a vehicle rudder angle control apparatus (FIG. 3) wherein the abnormality detecting means 9 in the vehicle rudder angle control apparatus of the first aspect comprises a hydraulic signal generation valve 90 for converting into a hydraulic signal the mechanical displacement corresponding to the relative rotational angle between the steering shaft connected to the steering wheel of the steering means 1 and the output shaft of the rudder angle detecting means 8, and the power control means 5 controls the hydraulic power to the power assisting means 6 on the basis of the hydraulic signal output from the abnormality detecting means 9.

The vehicle rudder angle control apparatus of the third aspect has the following operations and effects. The operations and effects of the third aspect which are different from those of the first aspect will be described in detail below.

The level of the hydraulic signal as the abnormality state signal output from the abnormality detecting means 9 is equal to or lower than the level of the pressure of the power supply unit 7 which supplies the hydraulic power. The characteristics of the hydraulic signal are given such that its signal level is a minimum level regardless of the magnitude of the relative rotational angle int eh normal state, i.e., within the predetermined range of relative angle, and that its signal level is abruptly increased with an increase in relative rotational angle outside the predetermined range. When the level of the hydraulic signal exceeds the predetermined level, the power control means 5 performs supply or discharge of the working oil to or from the power assisting means 6.

With the above arrangement, detection precision of the abnormal level can be improved and the means for transmitting the mechanical signal can be omitted. Therefore, discrimination of the normal state form the abnormal state can be facilitated. Power control in the respective states can be effectively performed with high speed. In particular, during steering in the normal state, a control error caused by an erroneous operation can be eliminated. In addition, a movable member for transmitting the mechanical signal is omitted, and therefore the structural limitations can be minimized. Therefore, the abnormality detecting means and the power control means can be arranged to be compact.

According to a fourth aspect of the present invention, there is provided a vehicle rudder angle control apparatus (FIG. 4) wherein the power control means 5 in the vehicle rudder angle control apparatus of the first aspect comprises a first power control means 40 and a second power control means 50. The first power control means 40 controls the power supplied from the second power control means 50 on the basis of the control signal output from the electronic control unit 4 and the rudder angle signal output from the rudder angle detecting means 8. The control power is supplied from the first power control means 40 to the second power control means 50. The second power control means 50 receives the power from the power supply unit 7 and controls the power supplied to the first power control means 40 and/or the power assisting means 6 on the basis of the mechanical signal representing the state signal output from the abnormality detecting means 9. The control power output from the first power control means 40 is controlled and supplied to the power assisting means 6.

The vehicle rudder angle control apparatus of the fourth aspect has the following operations and effects. The operations and effects of the fourth aspect which are different from those of the first aspect will be described in detail below.

The first power control means 40 controls the power supplied from the second power control means 50 on the basis of the control signal output from the electronic control unit 4 and the rudder angle signal output from the rudder angle detecting means 8 and supplies the control power to the power assisting means 6 through the second power control means 50. Therefore, the auxiliary steering power against the driver's steering force or the external force acting on the vehicle is controlled.

The second power control means 50 is arranged between the power supply unit 7 and the power assisting means 6 in the hydraulic circuit and constitutes a kind of flow path switching means having an output port for outputting the power to the first power control means 40 and an input port for receiving the control power from the first power control means 40. The second power control means 50 controls an opening area of flow paths between the power supply unit 7 and the first power control means 40 and between the first power control means 40 and the power assisting means 6, or an opening area of a bypass flow path for directly coupling between the power supply unit 7 and the power assisting means 6.

In the normal state, the flow paths in the second power control means 50 are set such that the power supply unit 7 perfectly communicates with the first power control means 40 and the first power control means 40 perfectly communicates with the power assisting means 6. When a deviation between the steering means 1 and the rudder angle detecting means 8 is increased and the level of the state signal from the abnormality detecting means 9 reaches a level corresponding to the abnormal state, the second power control means 50 gradually restricts communication between the power supply unit 7 and the first power control means 40 and between the first power control means 40 and the power assisting means 6 in accordance with an abnormal state level. The second power control means 50 controls the assisting force of the power assisting means 6 by controlling the opening area of the bypass flow path independently of control of the first power control means 40 so as to cause the abnormal signal level to reach the normal signal level or maintain the normal signal level.

As described above, the power supplied from the power supply unit 7 can always be utilized effectively. Power assistance can be assured even in the abnormal state accompanying the failure of the electrical system. Even if the electronic control unit malfunctions, the driver can operate the vehicle without any difficulty.

In addition, steering can be performed with a small steering force as in the conventional vehicle power steering apparatus (power steering system), and therefore operability can be improved.

According to a fifth aspect of the present invention, there is provided a vehicle rudder angle control apparatus (FIG. 5) wherein the first power control means 40 in the vehicle rudder angle control apparatus of the second aspect comprises: an electric motor 40a rotated on the basis of a control signal output from the electronic control means 4; and a hydraulic control means 40b consisting of a transmitting means 40c connected to a first shaft 40e of the electric motor 40a and a second shaft 40f connected to the output shaft of the rudder angle detecting means 8, and a hydraulic switching means 40d for controlling a flow path in correspondence with a relative rotational position between the first and second shafts 40e and 40f.

The vehicle rudder angle control apparatus of the fifth aspect has the following operations and effects. The operations and effects of the fifth aspect which are different from those of the second aspect will be described in detail below.

In the first power control means 40, the electric motor 40a is rotated on the basis of the control signal output from the electronic control unit 4. The first shaft 40e is rotated by the electric motor 40b. The second shaft 40f is rotated by the output shaft of the rudder angle detecting means 8. The hydraulic control means 40b inserts the transmitting means 40c between the first and second shafts 40e and 40f and causes the hydraulic switching means 40d to control the power corresponding to the relative rotational angle between the first and second shafts 40e and 40f. When the electric motor 40a is deenergized, the first power control means 40 is held by the transmitting means 40c in a neutral position wherein the power is not supplied to the power assisting means 6 through the hydraulic switching means 40d. Therefore, reverse power acting can be prevented, and manual steering without power assistance is allowed.

The danger can be prevented in a manual steering state until the state signal output from the abnormality detecting means 9 reaches the predetermined level. Therefore, steering against the failure of the electrical system, and particularly the failure of the motor system can be quickly performed.

DETAILED DESCRIPTION OF THE PREFERRED EMBODIMENTS

A vehicle rudder angle control apparatus according to a first embodiment of the present invention will be described with reference to FIGS. 7 and 8.

Figure 1:
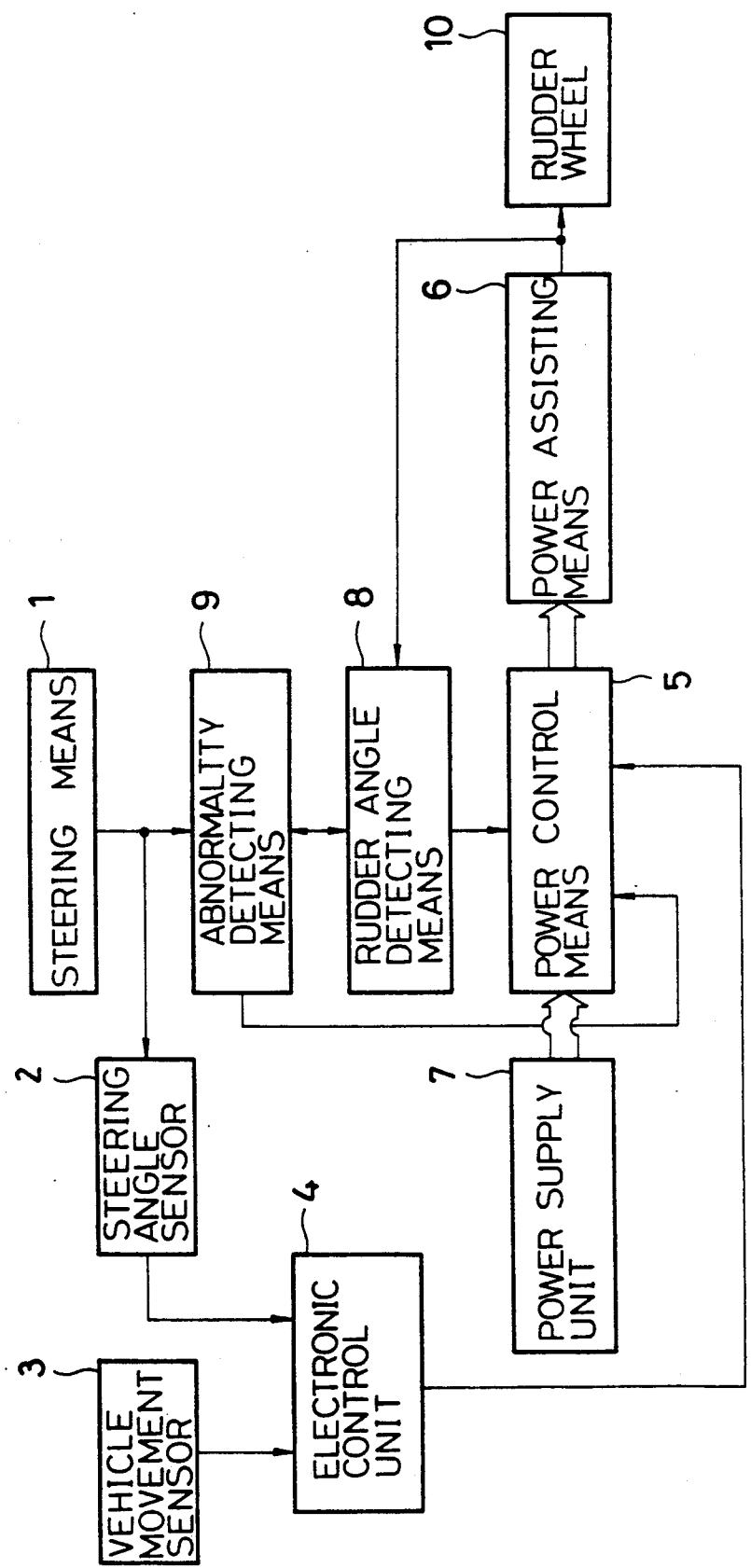
FIG. 1 is a schematic block diagram showing the principle of a first aspect according to the present invention.
Figure 2:
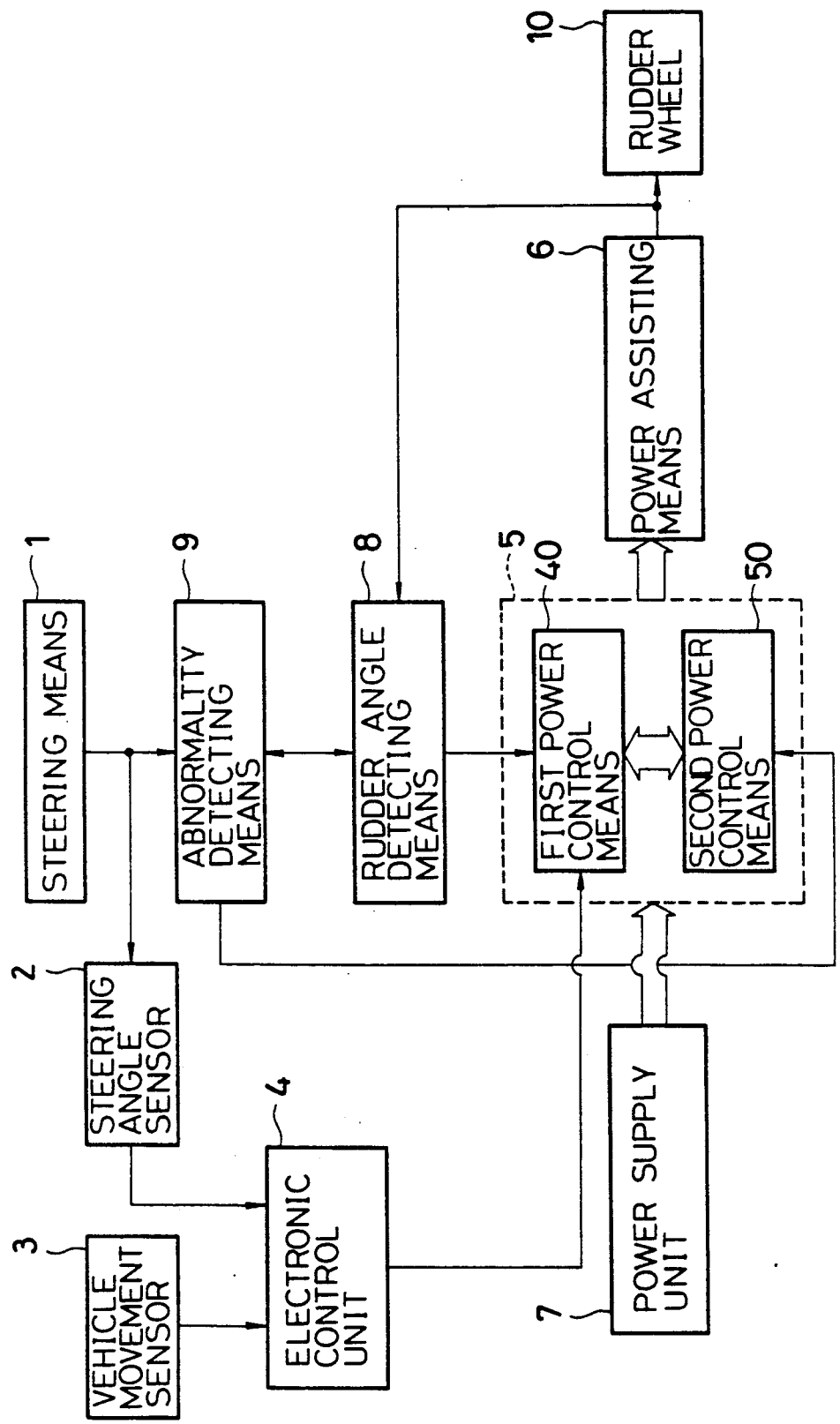
FIG. 2 is a schematic block diagram showing the principle of a second aspect according to the present invention.
Figure 3:
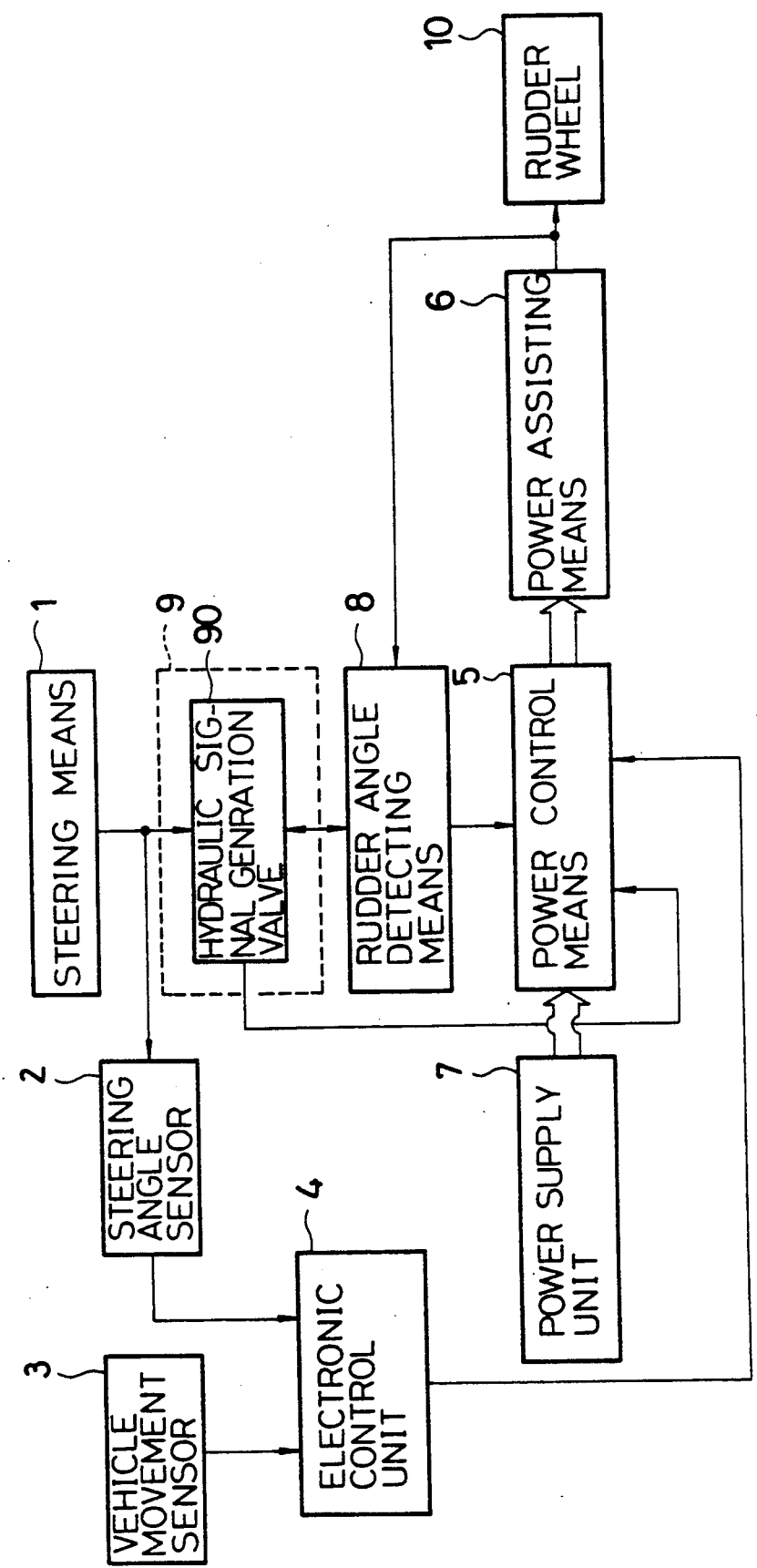
FIG. 3 is a schematic block diagram showing the principle of a third aspect according to the present invention.
Figure 4:
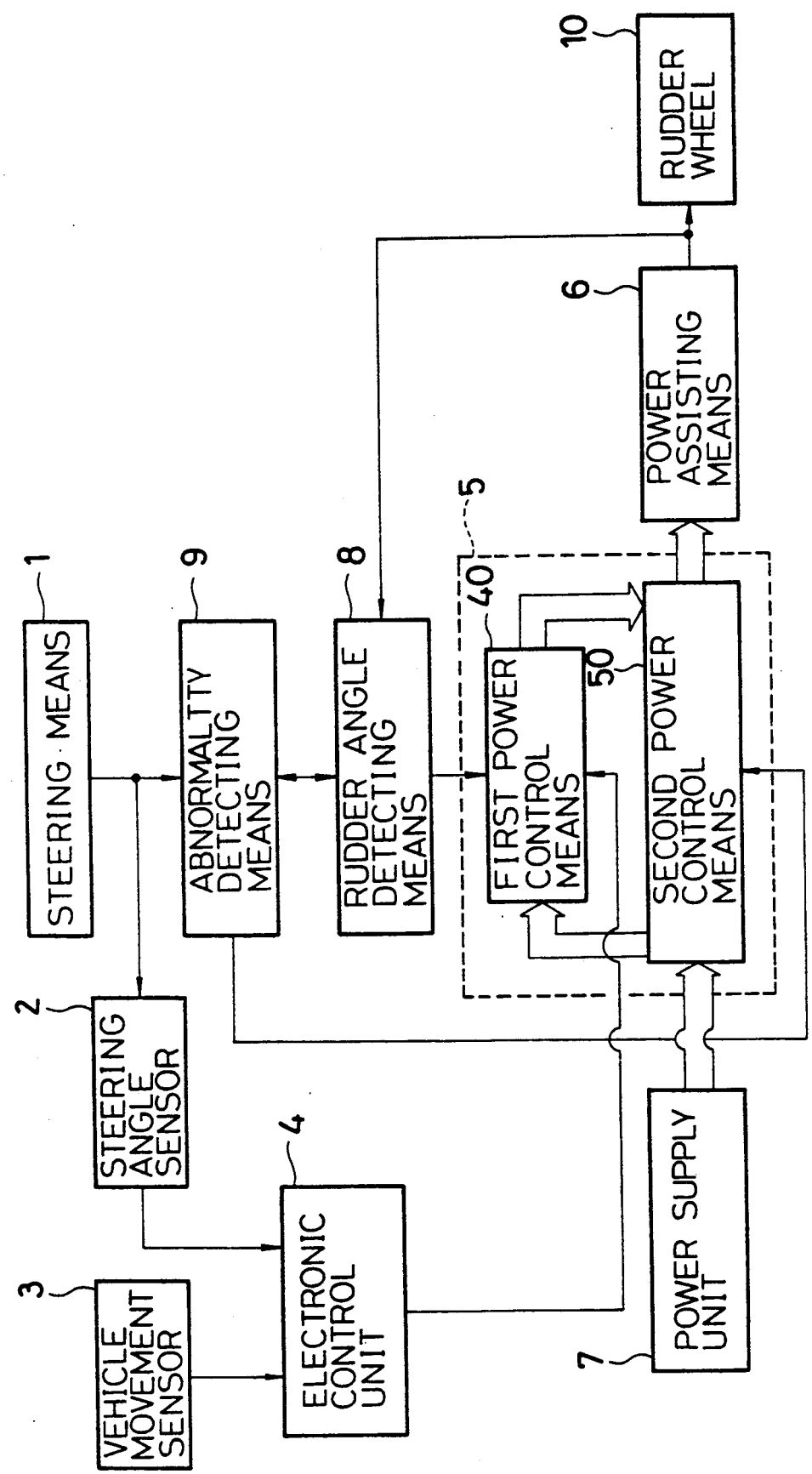
FIG. 4 is a schematic block diagram showing the principle of a fourth aspect according to the present invention.
Figure 5:
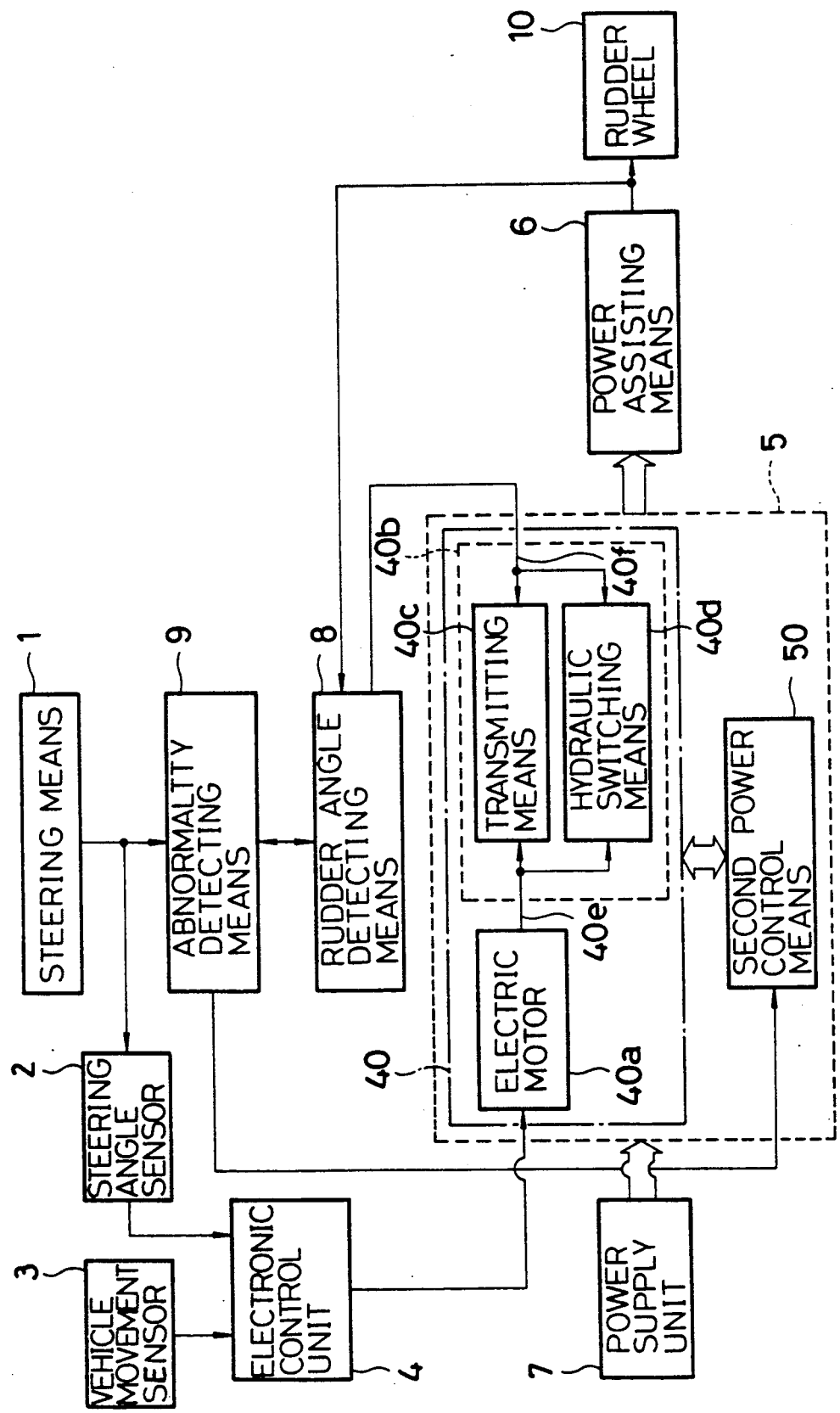
FIG. 5 is a schematic block diagram showing the principle of a fifth aspect according to the present invention.
Figure 6:
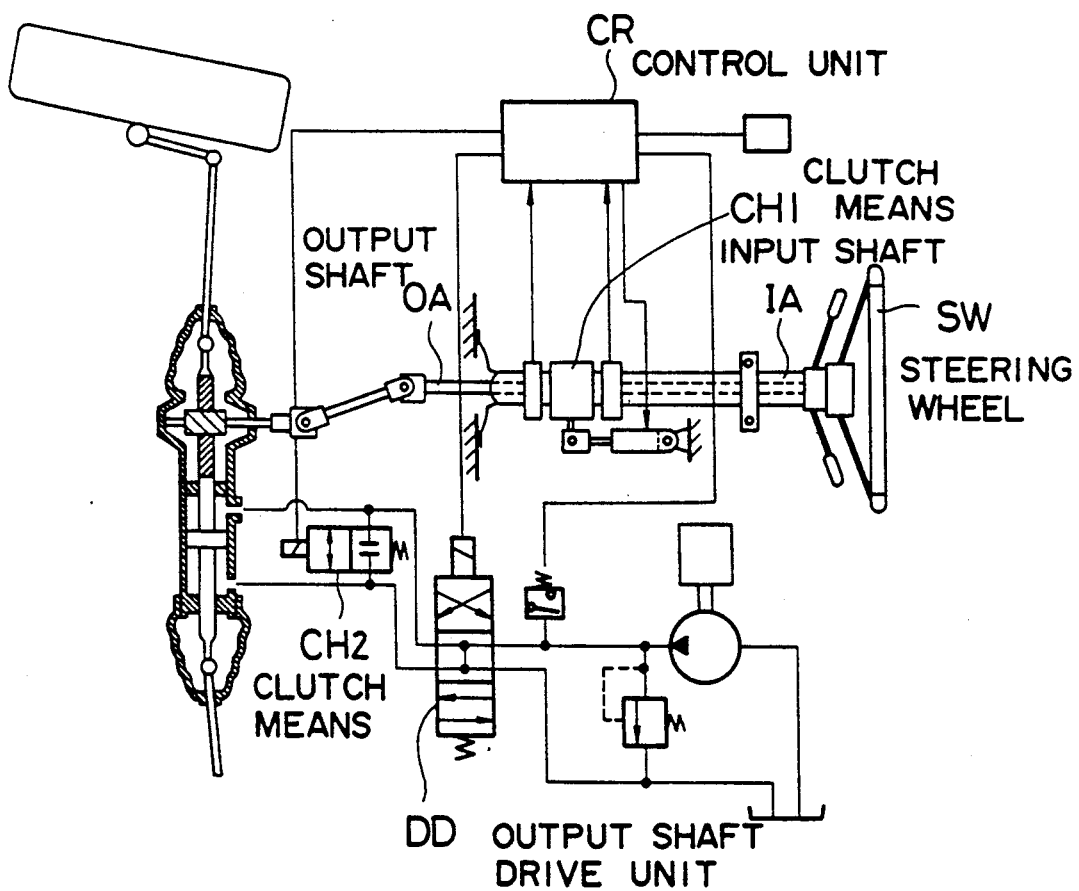
FIG. 6 is a schematic view showing a conventional arrangement.
Figure 7:
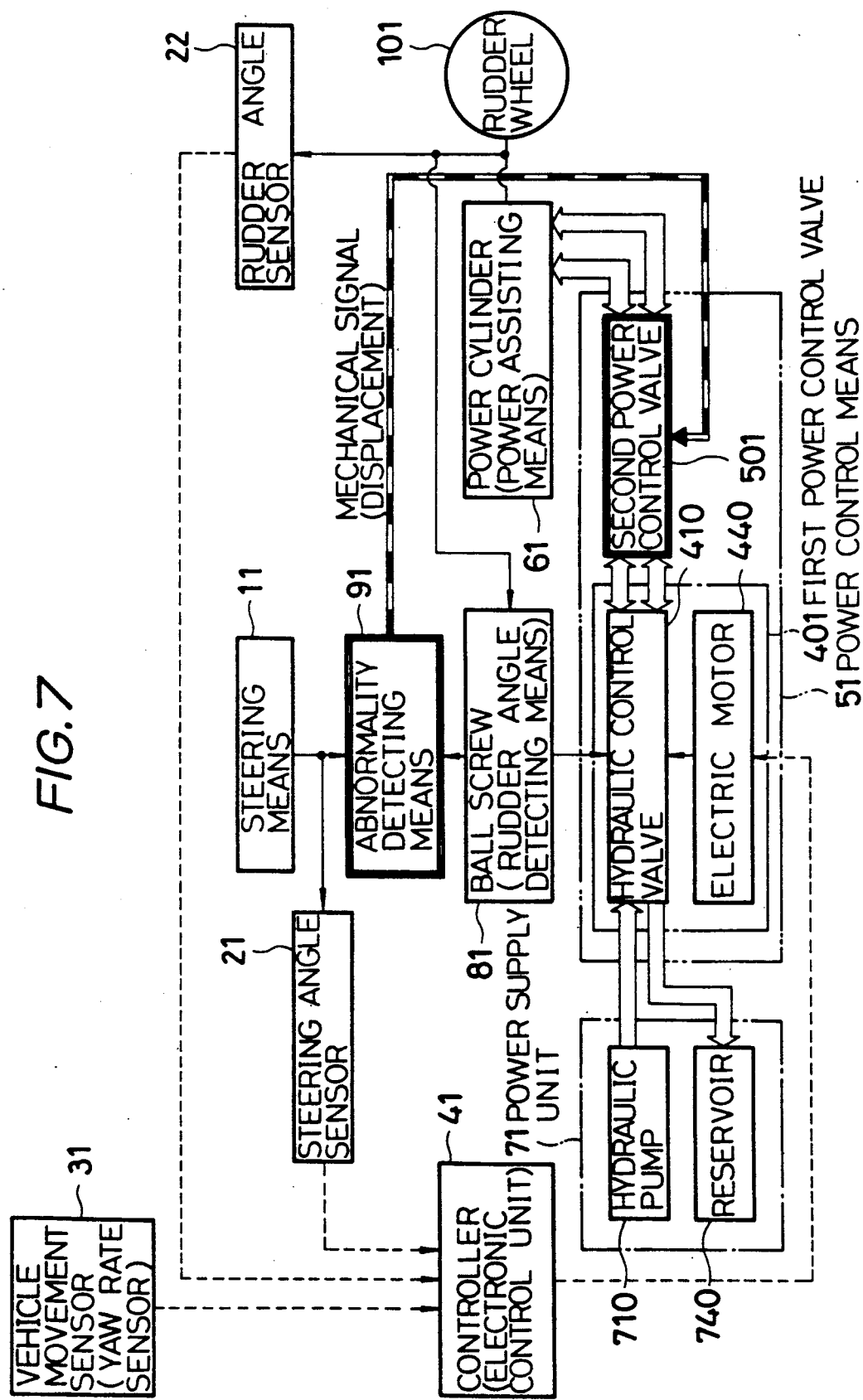
FIGS. 7 and 8 are a schematic view and a partial sectional view, respectively, showing a vehicle rudder angle control apparatus according to a first embodiment of the present invention.
Figure 8:
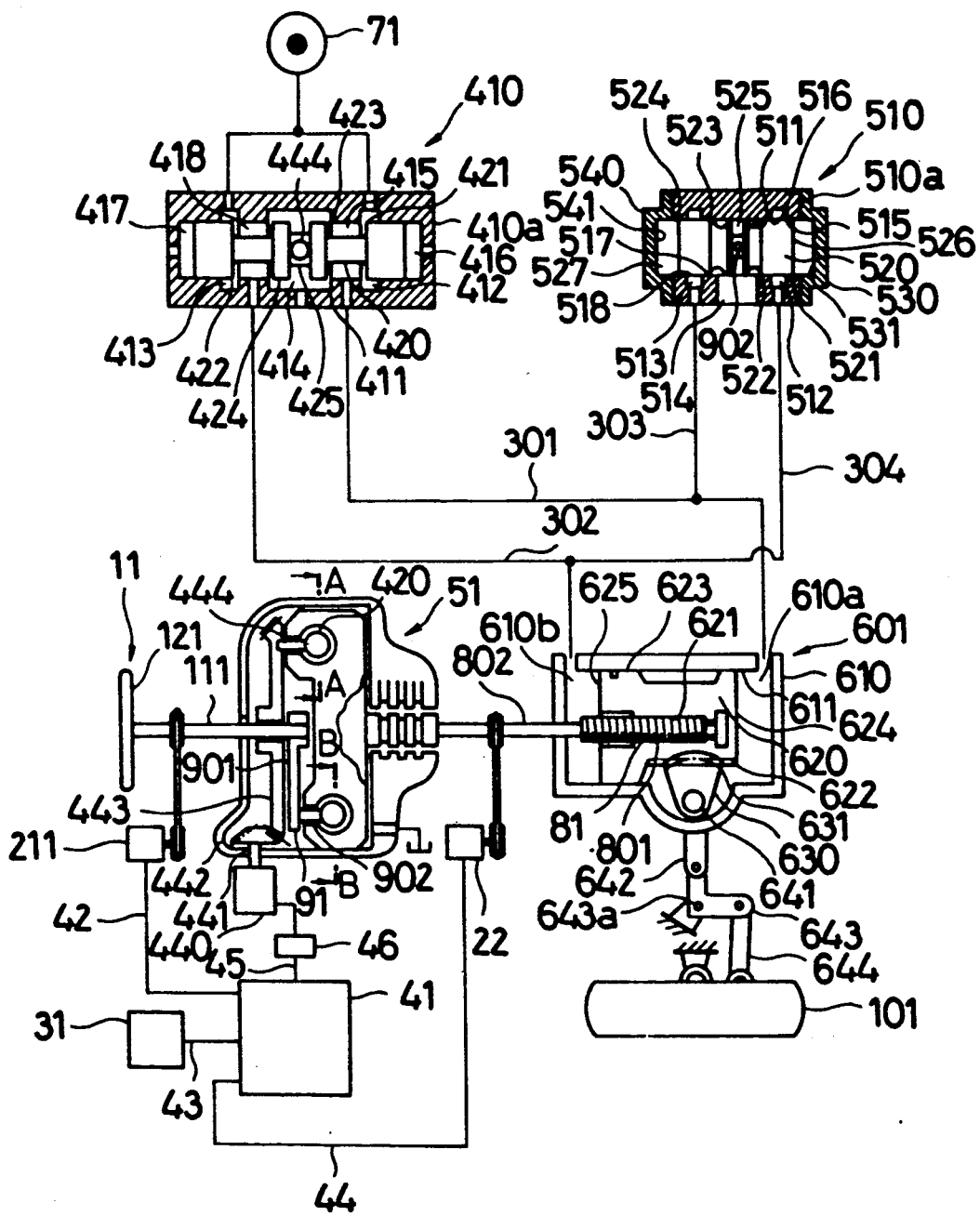

As shown in FIGS. 7 and 8, the vehicle rudder angle control apparatus of this embodiment comprises a steering means 11, steering and rudder angle sensors 21 and 22, a vehicle movement sensor (yaw rate sensor) 31, an electronic control unit 41, a power control means 51, a power assisting means 61, a power supply unit 71, a rudder angle detecting means 81, and an abnormality detecting means 91.

The steering means 11 comprises a steering wheel 121 and a steering shaft 111 connected to the steering wheel 121.

The steering angle sensor 21 is coaxially mounted on the steering wheel 121 of the steering means 11 and comprises a rotary potentiometer 211 for detecting a steering angle (input steering angle) of the steering wheel 121 and outputting an input steering angle signal. The rudder angle sensor 22 is rotated by an output shaft 802 of a ball screw 801 and indirectly detects the steering or rudder angle of the steerable or rudder wheels (front wheel) 101 of the vehicle turned by a control force input to the rudder wheels 101 and outputs a rudder angle signal.

The vehicle movement sensor 31 comprises a yaw rate sensor for detecting a yaw rate of the vehicle and outputting a signal representing the yaw rate. The vehicle movement sensor 31 is mounted at the center of gravity of the vehicle.

The electronic control unit 41 is connected to the steering angle sensor 21, the rudder angle sensor 22, and the vehicle movement sensor 31, respectively, through signal lines 42, 44, and 43. The electronic control unit 41 calculates a control amount necessary for control of the rudder wheels on the basis of the input steering angle signal output from the steering angle sensor 21, the rudder angle signal output from the rudder angle sensor 22, and the yaw rate signal output from the vehicle movement sensor 31. An electrical signal corresponding to the control amount is supplied from the electronic control unit 41 to the power control means 51 through a signal line 45 and a power amplifier 46.

The power control means 51 comprises a first power control valve 401 and a second power control valve 501.

The first power control valve 401 comprises an electric motor 440 connected to the electronic control unit 41 through the signal line 45 and the power amplifier 46 and operated in response to the electrical signal output from the electronic control unit 41, and a hydraulic control valve 410, connected to a hydraulic pump 710 of the power supply unit 71, for controlling the working fluid supplied from the power supply unit 71 to the power assisting means 61 through the second power control valve 501 in accordance with a relative rotational angle between the drive shaft of the electric motor 440 and the output shaft of the rudder angle detecting means 81. The hydraulic control valve 410 is arranged such that, of the entire working fluid output from the power supply unit 71, an unnecessary component except for the fluid supplied to the power assisting means is exhausted to a reservoir 740.

The hydraulic control valve 410 comprises a spool 420 having four large-diameter portions and a valve body 410a. The valve body 410a is connected to an output shaft 802 of the rudder angle detecting means 81. The valve body 410a has a cylindrical hole 411 which slidably receives the spool 420 eccentric from the rotary axis and has three annular grooves 412, 413, and 414. The spool 420 is coaxial with the steering shaft 111 and is connected to a pin 444 of a bevel gear 443 rotatably mounted on the steering shaft 111. The pin 444 is guided along a guide groove 425 of the spool 420. The bevel gear 443 is meshed with a bevel gear 442 integrally mounted with an output shaft 441 of the motor 440.

The second power control valve 501 comprises a hydraulic control valve 510 connected to the abnormality detecting means 91 to control the power assisting amount on the basis of the state signal output from the abnormality detecting means 91.

The hydraulic control valve 510 comprises a spool 520 having two large-diameter portions and one pin guide groove 525, and a valve body 510a. The valve body 510 is connected to the output shaft 802 of the rudder angle detecting means 81 in the same manner as in the valve body 410a and has a cylindrical hole 511 formed at a predetermined eccentric position with respect to the output shaft 802, and the spool 520 is slidably inserted into the cylindrical hole 511 having two annular grooves 512 and 513. The spool 520 is positioned by a pin 902 of a lever 901 of the abnormality detecting means 91 integrally mounted on the steering shaft 111. The pin 902 is guided along the groove 525 of the spool 520.

The power assisting means 61 comprises a power cylinder 601 connected to the first and second power control valves 401 and 501 of the power control means 51. This power cylinder adjusts the rudder angle of the rudder wheel by a necessary force.

The power cylinder 601 comprises a cylinder body 610, a piston 620, and a sector gear 630. Axial movement of the piston 620 is converted into rotational movement by the sector gear 630, and a rotational force is output. The cylinder body 610 has a cylindrical hole 611. Conduits 301 and 302 which communicate with the power control means 51 are open to both ends of the cylindrical hole 611. A ball screw mechanism of the rudder angle detecting means 81 is arranged in the piston 620. A rack gear 622 which is meshed with the sector gear 630 is formed on the piston 620.

The power supply unit 71 comprises a hydraulic pump 710 for supplying a required working fluid to the power control means 51, and the reservoir 740, connected to the hydraulic pump 710 and the hydraulic control valve 410, for storing the working fluid returning from the hydraulic control valve 410 and for supplying it to the hydraulic pump 710.

The rudder angle detecting means 81 comprises a ball screw 801 connected to the power assisting means 61 and converts the rudder angle of the rudder wheels 101 into the corresponding rotational angle.

The abnormality detecting means 91 comprises the detection lever 901 and the pin 902 and transmits the relative displacement between the steering shaft 111 of the steering means 1 and the output shaft of the rudder angle detecting means 81 as a state value to the second power control valve 501 of the power control means 51.

Operations and effects of the vehicle rudder angle control apparatus of the first embodiment will be described below.

An operation of the apparatus in the normal state will be briefly described below.

When the driver turns the steering wheel 121, an output signal from the rotary potentiometer 211 for detecting a rotational angle of the steering shaft 111 is changed. The electronic control unit 41 outputs through the signal line 45 the change in electrical signal, i.e., an electrical signal corresponding to the speed of the steering wheel 121 to the power amplifier 46 for controlling the electric motor 440. The electric motor 440 receives the power from the power amplifier 46 and starts rotating at a speed proportional to the electrical signal input to the power amplifier 46. The spool 420 of the first power control valve 401 is moved by the gears 442 and 443 and the pin 444 inserted into the gear 443 under pressure. The spool 420 is moved from the position indicated by the A—A section of FIG. 8 in one direction. When the driver turns the steering wheel 121 to the right, the spool 420 is moved to the right. The working oil from the power supply unit 71 is supplied to a power chamber 610a of the power cylinder 601 through the conduit 301.

When the power piston 620 is moved against the load acting on the rudder wheels 101, the output shaft 802 of the ball screw 801 is rotated upon rotation of the steering wheel 121 in the same direction as that of the steering wheel 121.

The rudder angle of the rudder wheels 101 is controlled in accordance with the rotational angle of the steering wheel 121 in the same manner as in the conventional power steering apparatus. However, in the vehicle rudder angle control apparatus of this embodiment, information is processed through an electrical circuit once so as to allow auxiliary steering in consideration of the vehicle movement.

An operation of the vehicle rudder angle control apparatus upon occurrence of an electrical system failure will be described in detail below.

Assume that the electric motor 440 is not operated due to the failure of the electronic control unit 41, the various sensors 21, 22, and 31, the power amplifier 46, or the like. In this case, when the driver turns the steering wheel 121 to the right, the detection lever 901 of the abnormality detecting means 91 which is always connected to the steering shaft 111 causes the spool 520 to move from the neutral position of the B—B section of FIG. 8 to the left through the pin 902. A displacement of the spool 520 is increased upon an increase in relative rotational angle between the steering shaft 111 and the output shaft 802 of the ball screw. When an actual displacement reaches a predetermined displacement, the annular groove 512 or 513 formed on the cylindrical hole 511 of the valve body 510a communicates with the reservoir 740 at atmospheric pressure through a gap formed between a corner 521 or 523 of the spool 520 and a corner 515 or 517 of the annular groove 512 or 513. Therefore, the annular groove 512 or 513 communicates with the power chamber 610b or 610a of the power piston 601 through a conduit 304 and the conduit 302 or a conduit 303 and the conduit 301. Therefore, the power chamber 610a and the power chamber 610b communicate with the reservoir 740 at atmospheric pressure through the above gap.

When the relative rotational angle between the steering shaft 111 and the ball screw output shaft 802 upon right steering of the steering wheel 121 is increased, an end face 527 of the spool 520 abuts against a surface 541 of a stopper 540. A torque acting on the steering wheel 121 is transmitted from the steering shaft 111 to the ball screw output shaft 802 through the lever 901, the pin 902, the spool 520, the stopper 540, and the valve body 510a. The rotational movement is converted into linear movement by the ball screw 81. Rack gear 622 of the piston 620 are selectively meshed with rack gear 631 of the sector gear 630 to rotate a sector shaft 641. Therefore, the rudder wheels 101 are turned to the right. In this case, a hydraulic circuit for preventing a right turn is established in the first power control valve 401. However, since the conduits 301 and 302 communicate with the atmospheric air through the second power control valve 501, a hydraulic force for preventing the right turn is not generated by the piston 620. In this case, the hydraulic circuit for preventing the right turn is defined as follows. Even if the piston 620 is to be moved to the left, the spool 420 of the first power control valve 401 is moved to the left upon deenergization of the electric motor 440, so that an opening area between the power source (power supply unit) 71 and the power chamber 610b is set to be larger than that formed between the power chamber 610b and an atmospheric release chamber 414 of the first power control valve 401. In this case, if the second power control valve 501 is not used and the conduit 302 does not communicate with the reservoir 740 at atmospheric pressure, the pressure in the power chamber 610b is increased. Therefore, left movement of the piston 620 is prevented.

With the above arrangement, when the electrical system is failed, the reverse assisting phenomenon of the hydraulic system can be perfectly prevented by the mechanical means, and steering almost equivalent to manual steering can be performed. Even if the electrical or hydraulic system is failed, danger can be prevented by minimally required manual steering. Therefore, the vehicle can be driven to, e.g., a vehicle repairing factory.

A vehicle rudder angle control apparatus according to a second embodiment of the present invention will be described with reference to FIGS. 9 and 10.

Figure 9:
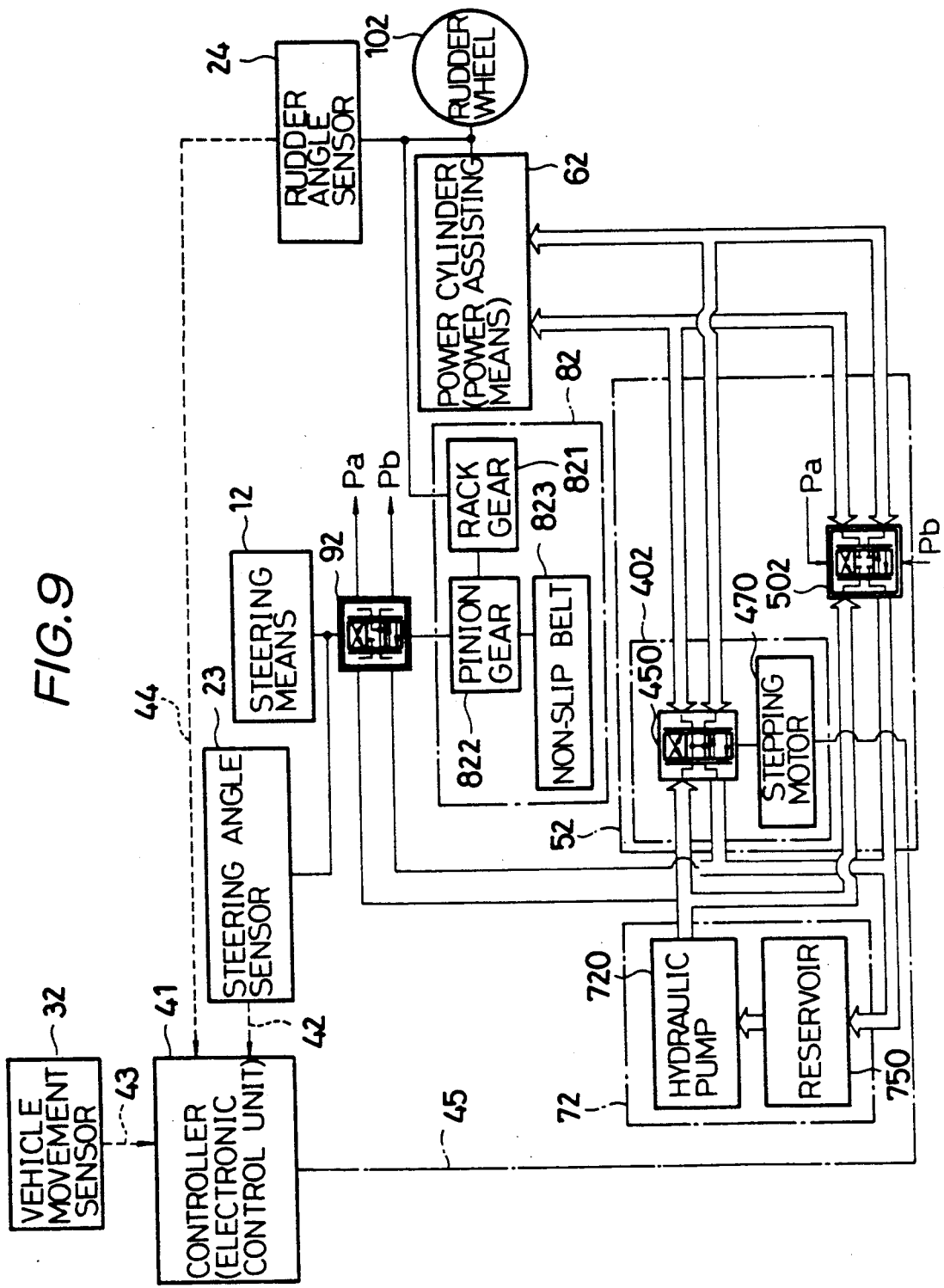
FIGS. 9 and 10 are a schematic view and a partial sectional view, respectively, showing a vehicle rudder angle control apparatus according to a second embodiment of the present invention.
Figure 10:
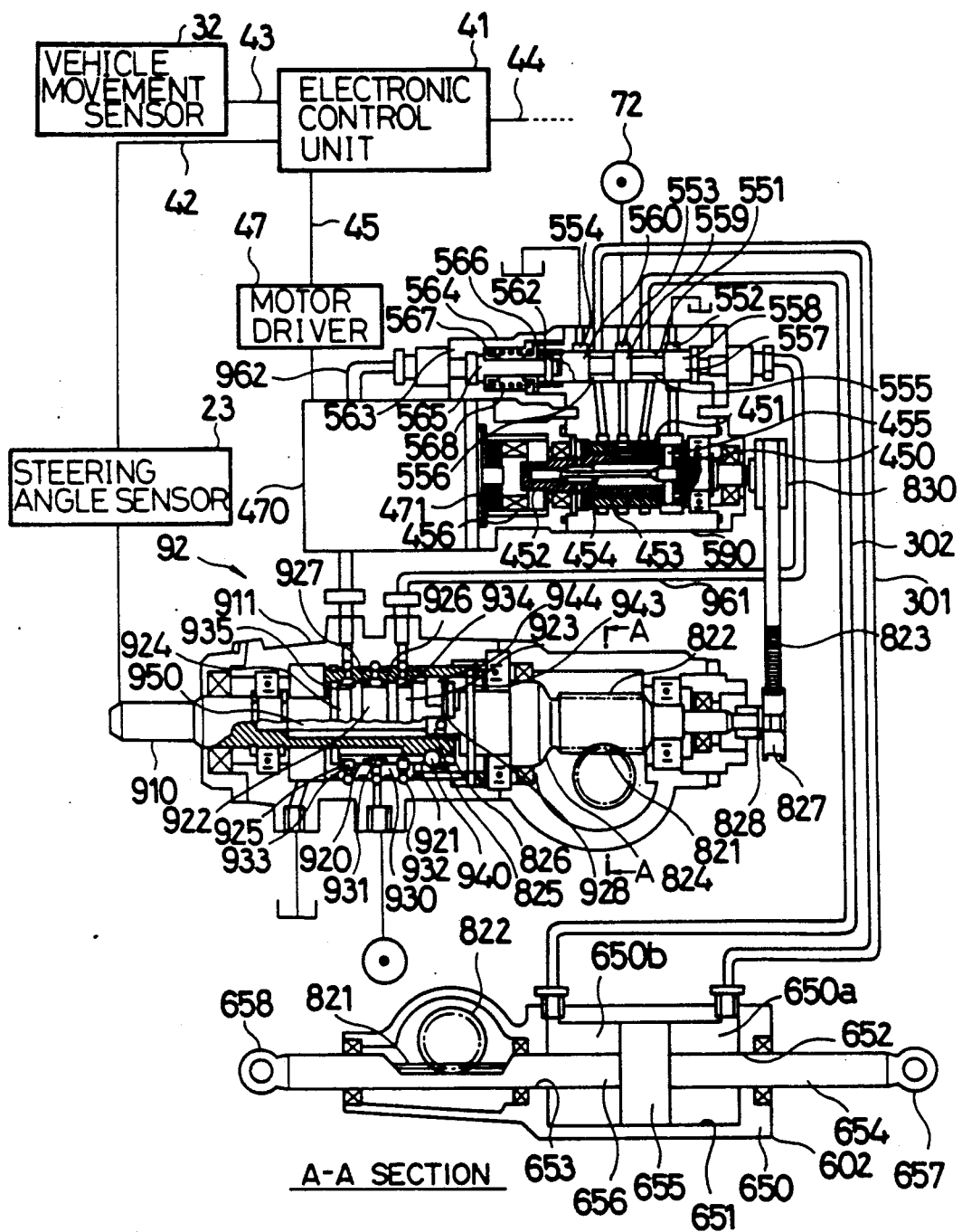

As shown in FIGS. 9 and 10, the vehicle rudder angle control apparatus of the second embodiment includes a steering means 12, steering and rudder angle sensors 23 and 24, a vehicle movement sensor 32, an electronic control unit 41, a power control means 52, a power assisting means 62, a power supply unit 72, a rudder angle detecting means 82, and an abnormality detecting means 92. The abnormality detecting means 92 outputs a hydraulic signal corresponding to a relative rotational angle between the steering means 12 and a pinion gear 202 of the rudder angle detecting means 82. A second power control valve 502 of the power control means 52 is controlled by the hydraulic signal from the abnormality detecting means 92. A power cylinder 602 is controlled independently of the first power control valve 402 controlled by an electrical signal. Differences between the first and second embodiments will be mainly described below.

The power control means 52 comprises a first power control valve 402 and a second power control valve 502.

The first power control valve 402 comprises a feedback shaft 450 connected to a non-slip pulley 830 through a pin, a stepping motor 470, a coupling 456, one end of which is coupled to a stepping motor shaft 471 through a set screw, a control shaft 452 connected to the other end of the coupling 456 through a set screw, a stopper pin 455 for limiting a positional relationship between the control shaft 452 and the feedback shaft 450 within a predetermined range, and a torsion bar 454 for restoring the above positional relationship to a neutral state in the nonenergized state of the motor 470. The feedback shaft 450, the stepping motor 470, the coupling 456, the control shaft 452, the stopper pin 455, and the torsion bar 454 are disposed in a housing 590 of the power control means 52.

The second power control valve 502 comprises a spool 557 and a neutral positioning means 564 consisting of a guide rod 565 integrally connected to the spool 557 through a lock pin 562, a spring 568 for maintaining the spool 557 at a neutral position (i.e., a position shown in FIG. 10), and spring supports 566 and 567.

The power assisting means 62 comprises a power cylinder 602 connected to the second power control valve 502 of the power control means 52. This power cylinder adjusts a rudder angle of rudder wheels by a required force.

The power cylinder 602 comprises a cylinder body 650, a cylindrical hole 651 formed in the cylinder body 650, a piston 655 slidably moved in the cylindrical hole 651, and piston rods 654 and 656 integrally connected to the piston 655 to output a force acting on the rudder wheels. The rods 654 and 656 are radially supported by guide holes 652 and 653 of the cylinder body 650, respectively. Cylinder chambers 650a and 650b separated by the piston 655 are defined at both end portions of the cylindrical hole 651 of the cylinder body 650. The cylinder chambers 650a and 650b communicate with the power control means 52 through conduits 301 and 302, respectively.

The rudder angle detecting means 82 comprises a rack gear 821 integrally formed on an output rod 656 of the power cylinder 62, a pinion gear 822 which is always meshed with the rack gear 821, a guide 825 integrally connected to the pinion gear 822 and having a stopper pin 826 at one end thereof, a pinion shaft 824 having a non-slip pulley 827 connected to a pin 828 at the other end thereof, a non-slip pulley 827 for transmitting rotation of the pinion shaft 824 to the feedback shaft 450 of the first power control valve 402, a non-slip belt 823, and a non-slip pulley 830.

The abnormality detecting means 92 comprises a housing 911, an input shaft 910 connected to the steering means 12, an inner sleeve 920, a steel ball 940 for converting movement of the inner sleeve 920 into linear movement by a spiral groove formed on the input shaft 910, a guide ring 944 for preventing removal of the steel ball 940, an outer sleeve 930 inserted in the housing 911 such that the axial movement of the outer sleeve 930 is restricted, a torsion bar 950 for acknowledging an abnormality to the driver in accordance with differences in steering force, and conduits 961 and 962 for transmitting the hydraulic signal output from the abnormality detecting means 92 to the second power control valve 502. In the neutral position shown in FIG. 10, since two annular grooves 923 and 924 formed on the outer circumferential surface of the inner sleeve 920 are always exposed to the atmospheric air, annular grooves 932 and 933 formed on the inner circumferential surface of the outer sleeve 930 and communicating with the annular grooves 923 and 924, and the conduits 961 and 962 which communicate with the annular grooves 932 and 933 are exposed to a reservoir 750 at atmospheric pressure.

Operations and effects of the vehicle rudder angle control apparatus having the above arrangement will be described. In this case, the operations and effects of the second embodiment which are different from those of the first embodiment will be mainly described below.

An operation of the apparatus in the normal state will be briefly described below.

When pulses having the number corresponding to a required rotational angle of a stepping motor 470 are supplied from the electronic control unit 41 to a clockwise rotation terminal of a motor driver 47, the motor driver 47 sequentially supplies currents to the phases of the stepping motor 470 having a multi-phase coil assembly. A shaft 471 of the stepping motor 470 is rotated clockwise by a rotational angle corresponding to the number of pulses. The control shaft 452 is rotated through the coupling 456 in a direction to increase a torsion angle of the torsion bar 454, so that a relative rotational angle relative to the feedback shaft 450 is increased. As a result, an opening area of a throttle defined by a valve surface 453 of the control shaft 452 and a valve surface 451 of the feedback shaft 450 is increased between a hydraulic pump 720 and a power chamber 650b of the power cylinder 62 and between a power chamber 650a of the power cylinder 62 and a reservoir (atmospheric air pressure) 750 of the power supply unit 72 but is decreased between the power chamber 650b and the reservoir 750 and between the hydraulic pump 720 and the power chamber 650a. Therefore, the piston 655 is urged to the right, and its movement is transmitted to the feedback shaft 450 through the rack gear 821, the pinion gear 822, the non-slip pulley 827, the non-slip belt 823, and the non-slip pulley 830. The pressure is decreased such that the relative rotational angle between the control shaft 452 and the feedback shaft 450 comes close to a neutral position. The pressure in the power chamber 650b is decreased until it is balanced with the load acting on the piston rods 654 and 656. In this manner, an output displacement of the power cylinder 602 can be applied in accordance with the rotational angle of the stepping motor 470.

An operation of the vehicle rudder angle control apparatus will be described when a failure such as an electronic circuit failure or damage to the feedback belt occurs.

(i) Operation in which the stepping motor 470 of the first power control valve 402 is not operated in an energized state by a failure of the electronic control unit 41 or the motor driver 47

In this case, upon rudder of the steering wheel to the right, since the first power control valve 402 cannot be controlled, the relative rotational angle between the input shaft 910 of the abnormality detecting means 92 and the pinion gear shaft 824 is increased in accordance with an increase in steering angle. The inner sleeve 920 is moved from the neutral position (FIG. 10) to the right by the input shaft 910 and the steel ball 940 of the ball screw mechanism of the abnormality detecting means 92 which is arranged at the right end portion of the inner sleeve 920 of the abnormality detecting means 92. When the rotational angle is increased, the annular groove 922 formed on the outer circumferential surface of the inner sleeve 920 communicates with the annular groove 932 formed on the inner circumferential surface of the outer sleeve 930. The working oil from the power supply unit 72 is supplied to the second power control valve 502 through the conduit 961. In the second power control valve 502, the hydraulic pressure represented by the signal from the abnormality detecting means 92 acts on the right end of the large-diameter portion 558 of the spool 557. The left end of the large-diameter portion 560 of the spool 557 is exposed to the reservoir 750 by the abnormality detecting means 92, so that the atmospheric pressure acts on the left end. The spool 557 is held at the neutral position (FIG. 10) by the neutral positioning means 564 provided at the end portion of the spool 557 when a pressure difference between both the ends of the spool 557 is smaller than a predetermined value. However, when the hydraulic force acting on the end face of the spool large-diameter portion 560 overcomes the force of a neutral positioning mechanism 564, the spool 557 is moved to the left by the hydraulic signal supplied through the conduit 961. When a hydraulic chamber 555 defined by a cylinder 551 of the second power control valve 502 and the spool 557 communicates with an annular groove 553 formed in the cylinder 551, the working oil from the hydraulic pump 720 of the power supply unit is supplied to the power chamber 650b of the power cylinder 62 through the conduit 302. The other power chamber 650a communicates with the atmospheric reservoir 750 through the conduit 301, an oil chamber 556 of the second power control valve 502 and an annular groove 554. In the first power control valve 402, the feedback shaft 450 is rotated upon driver's steering through the torsion bar 950 of the abnormality detecting means 92, the pinion shaft 824, the non-slip pulleys 827 and 830, and the non-slip belt 823, so that the rotational angle relative to the control shaft 452 is increased. When the relative rotational angle exceeds the predetermined value, a stopper (not shown) of the control shaft 452 abuts against the pin 455 fixed to the feedback shaft 450, and the control shaft and the feedback shaft are rotated together. The first power control valve 402 has a hydraulic circuit opposite to that formed in the second power control valve 502. More specifically, in the hydraulic circuit of the first power control valve 402, the power chamber 650a communicates with the delivery port of the hydraulic pump 720, and the power chamber 650b communicates with the reservoir 750. Therefore, this hydraulic circuit supplies a hydraulic power in a direction to prevent steering. However, the reverse power assisting phenomenon is released by the vehicle movement of the second power control valve 502. The steering force acting on the steering wheel is changed by an external force acting from the rudder wheels 102 onto the piston rods 654 and 656 of the power cylinder 62. When this external force is smaller than a reaction force generated upon torsion of the torsion bar 950, the steering force structurally causes the fail-safe mechanism to operate.

A predetermined relative rotational angle is given to obtain the reaction force corresponding to the torsion angle of the torsion bar 950. An external force from a road surface to change the direction of the rudder wheels 102 is suppressed. For example, when the rod 656 of the power cylinder 62 is moved to turn the rudder wheels 102, the feedback shaft 450 of the first power control valve 402 is rotated through the rudder angle detecting means 82. The pressure of the power chamber 650a or 650b which is against the external force is increased. In this manner, movement of the piston 655 is prevented by the hydraulic force against the external force, and therefore stable traveling is always assured.

(ii) Operation in which the stepping motor 470 is not operated in the deenergized state or a belt 223 of the rudder angle detecting means 82 is cut The first power control valve 402 is held such that a switching state of the valve surface 451 of the feedback shaft 450 and the valve surface 453 of the control shaft 452 is kept in a neutral state by the torsion bar 454, both ends of which are connected to the feedback shaft 450 and the control shaft 452, so as to allow communication between the hydraulic pump 720, the reservoir 750, and the power chambers 650a and 650b. Therefore, even if the second power control valve 502 is not operated, the reverse power assisting phenomenon does not occur, and manual steering can be sufficiently assured.

With the above arrangement, when the motor 470 is held in the deenergized state, or the feedback belt is damaged, the hydraulic system is held in the neutral state. Therefore, the reverse power assisting phenomenon does not occur. The driver can quickly and properly operate the output rods 654 and 656 connected to the rudder wheels through the steering wheel, the torsion bar 950 and the rudder angle detecting means 82 in the same manner as in a manual steering system.

A vehicle rudder angle control apparatus according to a third embodiment of the present invention will be described with reference to FIG. 11.

Figure 11:
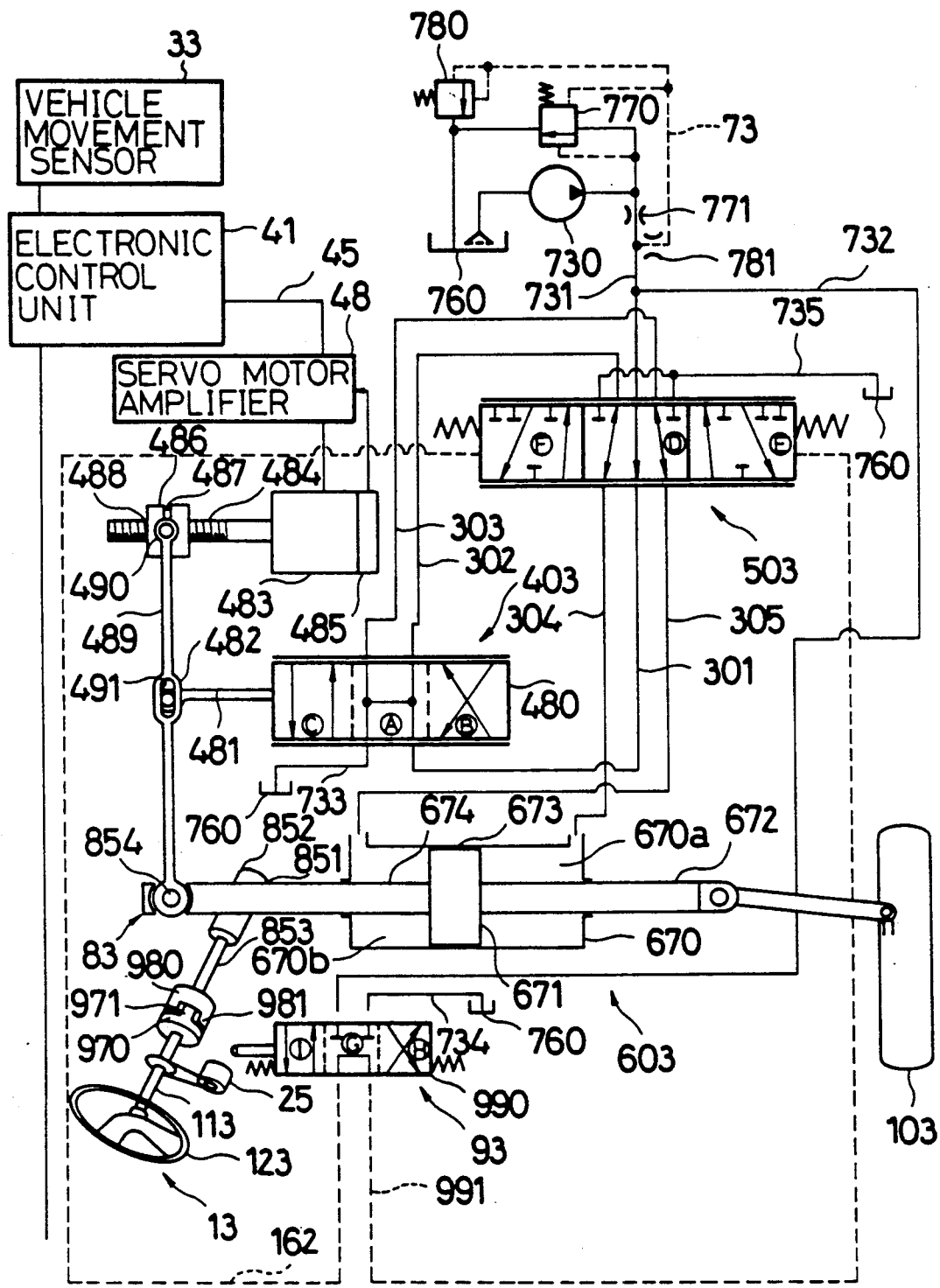
FIG. 11 is a schematic view showing a vehicle rudder angle control apparatus according to a third embodiment of the present invention.

As shown in FIG. 11, the vehicle rudder angle control apparatus comprises a steering means 13, a steering angle sensor 25, a vehicle movement sensor 33, an electronic control unit 41, a power control means 53, a power assisting means 63, a power supply unit 73, a rudder angle detecting means 83, and an abnormality detecting means 93. The abnormality detecting means 93 has a hydraulic signal generation function (e.g., the function shown in the second embodiment) and an active control function for correcting a deviation of a vehicle traveling direction which is caused by disturbance.

Differences between the second and third embodiments will be mainly described in detail.

The power control means 53 comprises a first power control valve 403 and a second power control valve 503.

The first power control valve 403 controls a power cylinder 603 on the basis of an electrical signal from the electronic control unit 41 and comprises a hydraulic switching valve 480, a servo motor 483 integral with an angle sensor 485, a guide nut 486, and a feedback link 489.

The second control valve 503 controls an oil pressure applied to the first power control valve 403 and an output oil pressure applied to the power cylinder 603 on the basis of the hydraulic signal from the abnormality detecting means 93. The second control valve 503 comprises a hydraulic switching valve which can be operated in accordance with three operating states defining relationships of eight ports. The hydraulic switching valve 503 may be constituted by a plurality of spool valves.

The power assisting means 63 comprises a power cylinder 603 connected to the second power control valve 503 of the power control means 53. This power cylinder adjusts the rudder angle of the rudder wheels by a required force.

The power cylinder 603 comprises a cylinder body 670, a piston 671 slidably fitted in a cylindrical hole of the cylinder body 670, and output rods 672 and 674 integral with the piston 671. Cylinder chambers 670a and 670b partitioned by the piston 671 communicate with the second power control valve 503 through conduits 304 and 305, respectively. The output rods 672 and 674 are connected to rudder wheels 103 or other rudder wheels (not shown).

The abnormality detecting means 93 is arranged to operate a 4-port switching valve 990 in accordance with a relative rotational angle between an input shaft 970 connected to a steering shaft 123 and a detection shaft 980 connected to a pinion gear shaft 853 of the rudder angle detecting means 83. If the relative rotational angle between the shafts 970 and 980 falls within a predetermined range, oil pressures represented by the two hydraulic signals output to the second power control valve 503 are equal to each other. When the relative rotational angle represents a value exceeding the predetermined range, the pressure represented by one hydraulic signal comes close to or is equal to the pressure of a delivery path 731, and the pressure represented by the other hydraulic signal comes close or is equal to the atmospheric pressure. When the relative rotational angle is further increased, the input shaft 970 and the detection shaft 980 are brought into contact with a projection 971 and a recess 981, respectively. Therefore, a driver's steering force is transmitted from a steering wheel 123 to the pinion gear shaft 853.

The operations and effects of the vehicle rudder angle control apparatus of the third embodiment will be described. The operations and effects of the third embodiment which are different from those of the second embodiment will be mainly described below.

A normal operation of a relationship between the abnormality detecting means 93, the first power control valve 403, and the second power control valve 503 will be briefly described. In this case, auxiliary steering without driver's steering is exemplified.

When a vehicle traveling direction is changed to the left by disturbance such as a side wind, the vehicle movement is detected by the vehicle movement sensor 33. The electronic control unit 41 calculates an auxiliary steering amount for steering to the right on the basis of a signal output from the vehicle movement sensor 33 and outputs the auxiliary steering signal to a servo motor amplifier 48. The servo motor amplifier 48 performs rotational angle control to move the guide nut 486 to the left in accordance with a feedback signal from the angle sensor 485. Upon movement of the guide nut 486 to the left, a control rod 481 of the hydraulic switching valve 480 of the first power control valve 403 is pulled to the left through the feedback link 489. The hydraulic circuit of the hydraulic switching valve 480 of the first power control valve 403 is changed from the A block of the neutral position to the B block. Since in a control oil path 303 from the hydraulic switching valve 480 the second power control valve 503 is set in the D block of the normal position upon reception of the hydraulic signal representing the same pressure from the abnormality detecting means 93, the working oil is supplied from a hydraulic pump 730 through the second power control valve 503 and an oil path 301. The supplied working oil flows in the power chamber 670b of the power cylinder 603 through again the second power control valve (D block) 503 and an oil path 305. The power chamber 670a communicates with a reservoir 760 through an oil path 304, the second power control valve (D block) 503, an oil path 302, the first power control valve (B block) 403, and an oil path 733 and is set at the atmospheric pressure. A hydraulic force acts on the piston 673 to the right. When the hydraulic force overcomes the resistance acting on the rudder wheels 103, the piston 673 is moved to the right. The rudder wheels 103 are turned right, and the traveling direction is changed to the right.

An operation upon occurrence of electrical system trouble although the hydraulic system is normal will be described below.

If trouble occurs in the electrical system, the hydraulic switching valve 480 of the first power control valve 403 is not operated even if the driver turns the steering wheel 123. In this case, the rod 674 of the power cylinder 603 and the pinion gear shaft 853 of the rudder angle detecting means 83 connected to the rod 674 are not moved. For this reason, the relative rotational angle between the input shaft 970 of the abnormality detecting means 93 and the detection shaft 980 is increased with an increase in a driver's steering amount. For example, when the driver turns the steering wheel to the right and the relative rotational angle exceeds the predetermined range, the hydraulic signal generation valve 990 of the abnormality detecting means 93 is switched from the G block hydraulic circuit (two hydraulic signal levels are equal to each other) to the H block (I block for steering to the left) hydraulic circuit of the abnormal position. The working oil from the hydraulic pump 730 is supplied to a hydraulic signal path 991 through the delivery path 731, and a supply path 732. The hydraulic circuit of the second power control valve 503 is switched from the D block to the E block by the hydraulic signal. When the second power control valve 503 is set in the E block state, communication between the paths 731 and 301, between the paths 302 and 304, and between the paths 303 and 305 is inhibited. The path 731 which communicates with the delivery port of the hydraulic pump 730 communicates with the path 305 which communicates with the power chamber 670b. The path 304 which communicates with the power chamber 670a communicates with the path 735 which communicates with the reservoir 760. A pressure difference occurs between the power chambers 670a and 670b. A hydraulic force acts on the piston 673 in a direction to assist steering to the right. As a result, even if the electrical system is failed, the driver can lightly turn the steering wheel to turn the rudder wheels 103 to the right, thereby assuring performance equivalent to the conventional vehicle power steering apparatus. Even a powerless driver can easily steer the steering wheel.

As described above, the reverse power assisting phenomenon can be solved. In addition, power assistance in the failure state is assured and a steering force equal to that of the normal state is assured for driver's steering. Even if the electrical system is failed, a powerless driver can steer the steering wheel without difficulty.

What is claimed is:

1. Apparatus for controlling the angle of steerable wheels of a vehicle including steering means connected to steerable wheels of a vehicle for changing the steering angle of the steerable wheels, said steering means comprising a steering shaft and a steering wheel, a steering angle sensor for detecting a steering angle of said steering wheel, a vehicle movement sensor for detecting amount of movement of the vehicle, an electronic control unit for outputting an electrical signal corresponding to a control amount of the steerable wheels on the basis of the steering angle signal output from said steering angle sensor and the movement amount signal output form said vehicle movement sensor, power control means for converting the control signal output from said electronic control unit into a power output, power assisting means for driving the steerable wheels on the basis of the power output from said power control means, and power supply means for supplying the power to said power control means, said apparatus comprising:

angle detecting means, connected to said power assisting means and said power control means, for mechanically detecting a displacement of an output unit of said power assisting means, said angle detecting means including an output shaft; and abnormality detecting means, arranged between said steering shaft of said steering means and said output shaft of said angle detecting means, for selectively detecting a normal state and an abnormal state due to disturbance in said apparatus, based on a relative displacement between said steering shaft and said output shaft of the angle detecting means and outputting a state signal to said power control means;

wherein said power control means comprises means for controlling the power for controlling the steerable wheels to avoid the abnormal state of said apparatus on the basis of the control signal output from said electronic control unit, the state signal output form said abnormality detecting means and the angle signal output from said angle detecting means.

2. An apparatus according to claim 1, wherein said power control means comprises:

first power control means for controlling the power assisting amount of said power assisting means on the basis of the control signal output from said electronic control unit and the angle signal output from said angle detecting means; and second power control means for controlling the power assisting amount on the basis of the state signal output from said abnormality detecting means.

3. An apparatus according to claim 1, wherein said abnormality detecting means comprises a hydraulic signal generation valve for converting into a hydraulic signal a mechanical displacement corresponding to the relative rotational angle between said steering shaft connected to said steering wheel of said steering means and said output shaft of said angle detecting means, and said power control means controls a hydraulic power to said power assisting means on the basis of the hydraulic signal output from said abnormality detecting means.

4. An apparatus according to claim 1, wherein said power control means comprises first power control means and second power control means, said first power control means being arranged to control a power supplied from said second power control means and supply the controlled power to said second power control means on the basis of the control signal output from said electronic control unit and the angle signal output from said angle detecting means; and said second power control means being arranged to receive a power from said power supply unit and selecting control a power supplied to said first power control means and said power assisting means on the basis of a mechanical signal representing the state signal output from said abnormality detecting means and to control and supply the controlled power output from said first power control means to said power assisting means.

5. An apparatus according to claim 2, wherein said first power control means comprises:

an electric motor rotated on the basis of the control signal output from said electronic control unit; and hydraulic control means including transmitting means for connecting a first shaft connected to said electric motor and a second, shaft connected to said output shaft of said angle detecting means, and hydraulic switching means for controlling a flow path in correspondence with a relative rotational position between said first and second shafts.

6. An apparatus according to claim 2, wherein said abnormality detecting means comprises:

a rotating member, connected to said steering shaft of said steering means, rotating in correspondence with rotation of said steering shaft, a relative displacement forming means for forming a mechanical displacement corresponding to a relative rotational angle between said steering shaft and said output shaft of said angle detecting means, and an engaging means for mechanically engaging said steering shaft with said output shaft of said angle detecting means when said relative rotational angle between said steering shaft and said output shaft of said angle detecting means exceeds a predetermined value, whereby said steering shaft rotates integrally with said steerable wheels through said relative displacement forming means and said engaging means when said steering shaft engages with said output shaft of said angle detecting means.

* * * * *